Feb. 21, 1967 P. R. J. COURT ET AL 3,305,632

TELEVISION RECEIVER IF FREQUENCY STABILIZING SYSTEM

Filed Nov. 14, 1963 2 Sheets-Sheet 1

INVENTORS
PATRICK R. J. COURT
PATRICK A. C. SEGRAVE
BY Samuel Lindenberg
ATTORNEY

TELEVISION RECEIVER IF FREQUENCY STABILIZING SYSTEM

Filed Nov. 14, 1963 2 Sheets-Sheet 2

Fig. 4

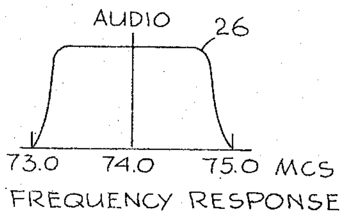

FREQUENCY RESPONSE OF RESTRICTED BANDWIDTH I.F. AMP. 73.0 - 75.0 MC (24-FIG.1)

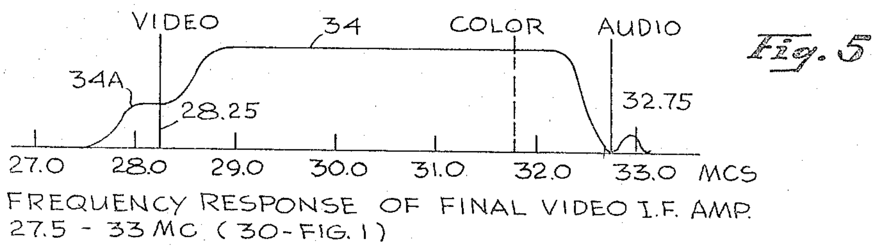
Fig. 5

FREQUENCY RESPONSE OF FINAL VIDEO I.F. AMP. 27.5 - 33 MC (30-FIG.1)

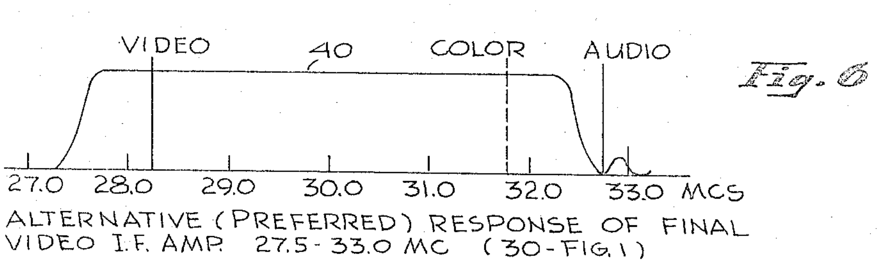
Fig. 6

ALTERNATIVE (PREFERRED) RESPONSE OF FINAL VIDEO I.F. AMP. 27.5-33.0 MC (30-FIG.1)

Fig. 7

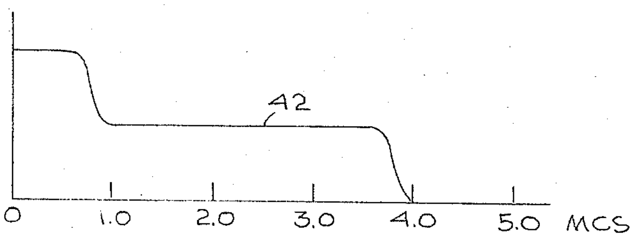

OVERALL RECEIVER VIDEO RESPONSE WITH UNCOMPENSATED VIDEO

Fig. 10

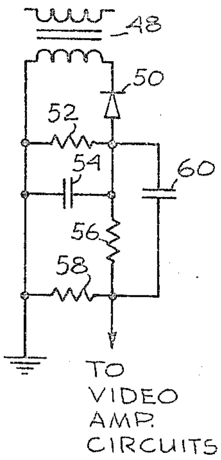

Fig. 8

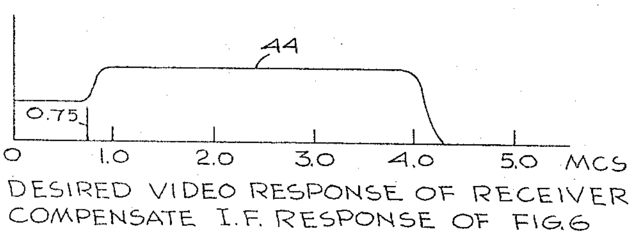

DESIRED VIDEO RESPONSE OF RECEIVER TO COMPENSATE I.F. RESPONSE OF FIG.6

Fig. 9

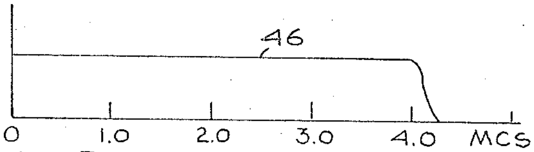

OVERALL RECEIVER VIDEO RESPONSE WITH COMPENSATED VIDEO

INVENTORS
PATRICK R.J. COURT
PATRICK A.C. SEGRAVE
BY Samuel Lindenberg
ATTORNEY

United States Patent Office 3,305,632
Patented Feb. 21, 1967

3,305,632
TELEVISION RECEIVER IF FREQUENCY STABILIZING SYSTEM

Patrick R. J. Court, Los Angeles, and Patrick A. C. Segrave, Santa Monica, Calif., assignors to International Telemeter Corporation, Los Angeles, Calif., a corporation of New York Filed Nov. 14, 1963, Ser. No. 323,792
5 Claims. (Cl. 178—5.8)

This invention relates to circuit arrangements for compensating for local oscillator drift in television receivers and more particularly to improvements therein.

In an application entitled Frequency Compensating System having Serial No. 310,377, filed September 20, 1963 by Patrick Court and Abraham Reiter, and assuned to a common assignee, a system is described and claimed whereby the frequency instability of the local oscillator used in a tuner, of a television receiver, for example, is corrected so that an intermediate frequency video carrier is finally recovered which has the precise frequency of a stable local oscillator. An audio carrier is also recovered, spaced 4½ megacycles from the video carrier, having its frequency precisely related to the local oscillator frequency.

The described system also indicates that the video carrier output from the tuner at the nominal frequency of 45.75 megacycles, is selected by means of a restricted-bandwidth first IF amplifier and applied as a first input to a first mixer. A second input to the first mixer is the output of a stable local oscillator. A second intermediate frequency carrier, which may be either the sum or the difference of the two inputs, is derived from the first mixer. This is amplified in a restricted-bandwidth second IF amplifier and applied to a second mixer along with the original broadband video and audio outputs from the tuner. The final intermediate frequency video carrier and audio carrier are recovered as the differences between the second IF carrier and the first IF carriers.

Because it is desired to have the carrier outputs from the second mixer independent of the amplitude modulation of the restricted-bandwidth first and second IF video carriers, the amplitude relationships of the inputs in the first mixer are chosen such that the minimum video carrier amplitude is greater than the constant amplitude of the local oscillator. The second IF carrier output from the first mixer is therefore substantially independent of the video modulation. In the second mixer, the second IF carrier is also arranged to be substantially greater in amplitude than the maximum video and audio carrier inputs. Two successive amplitude limiting processes therefore result, each of which may be of the order of 10 to 1 so that the overall amplitude limiting is of the order of 100 to 1. As a result of these two successive stages of limiting, the final IF video and audio carriers are substantially faithful replicas of the first IF video and audio carriers as derived from the tuner.

Because of the large amplitude swings of the video carrier, considerable gain is required in the restricted-bandwidth first IF amplifier at 45.75 megacycles. Similarly, substantial gain is required in the restricted-bandwidth second IF amplifier. This gain is used only for limiting and contributes nothing to the overall receiver gain as measured from the antenna terminals to the final video detector. Thus, if it were possible to eliminate the requirement for substantial gain in the first IF amplifier and the restricted-bandwidth second IF amplifier, a considerably more efficient circuit arrangement would result without affecting the overall receiver gain.

Accordingly, an object of this invention is to provide a circuit arrangement for deriving a stable intermediate frequency, despite tuner oscillator frequency errors, without the necessity for high gain IF amplifiers.

Another object of this invention is the provision of a novel and useful arrangement for compensating for the adverse effects of tuner oscillator frequency error wherein the requirement that the circuit provide amplitude limitation is minimized.

Yet another object of this invention is the provision of a novel, useful and alternative arrangement for eliminating the adverse effects of tuner oscillator frequency error in a television receiver.

These and other objects of this invention may be achieved by a circuit arrangement wherein instead of using the varying amplitude video carrier frequency as a reference, the constant amplitude audio carrier frequency is used as a reference. Thus, the IF output of the tuner is applied to a broadband circuit and to a narrow band amplifier. The narrow band amplifier separates out the frequency modulated audio carrier and this is applied to a first mixer, together with the output of a stable local oscillator. The resulting output, which is the sum of the two inputs, is applied to a second mixer to which there is also applied the output of the broadband circuit. The output of the second mixer is chosen as the difference between the two inputs. This provides an audio carrier which is precisely at the frequency of the stable local oscillator, and a video carrier whose frequency is precisely related to that of the audio carrier and therefore to that of the stable local oscillator. The deviation or error frequencies in the carriers which were produced by the deviation of the local oscillator within the tuner, are eliminated.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 4 is a freqeuncy response curve for a restricted-bandwidth IF amplifier used between the first and second mixers in the embodiment of the invention.

FIGURE 5 is a frequency response curve of the final IF amplifier which may be employed in the embodiment of the invention.

FIGURE 6 is an alternative frequency response characteristic for the final video IF amplifier.

FIGURE 7 shows an overall receiver video response characteristic with uncompensated video.

FIGURE 8 is the desired video response of a receiver to compensate for the response characteristic shown in FIGURE 6.

FIGURE 9 shows the overall receiver video response characteristics with compensated video; and FIGURE 10 is a circuit diagram illustrating how the video response characteristic shown in FIGURE 8 may be achieved.

Figures 1, 2, 3:
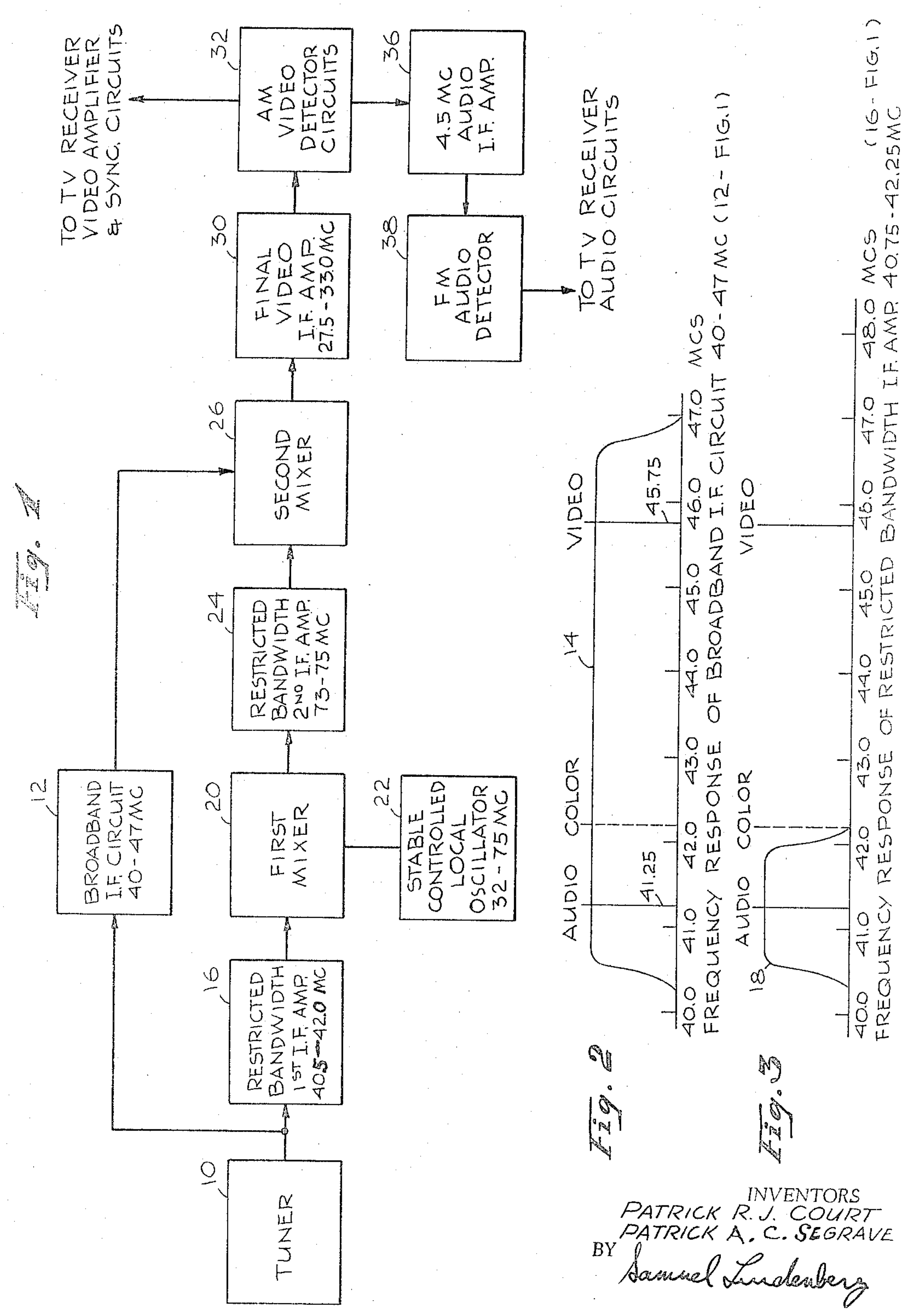
FIGURE 1 is a block schematic diagram of an embodiment of this invention.
FIGURE 2 is a frequency response diagram of the broadband IF circuit used in the embodiment of the invention.
FIGURE 3 is a frequency response curve of the restricted-bandwidth IF amplifier used in the embodiment of the invention.

Reference is now made to FIGURE 1 of the drawings which shows a block schematic diagram of an embodiment of the invention. The tuner 10 represents the usual tuner of a television receiver which includes a local oscillator for converting the received signals to a first intermediate frequency. At the output of the tuner 10 there is a first intermediate frequency video carrier having a nominal frequency of 45.75 megacycles, and an audio carrier at a nominal frequency of 41.25 megacycles. Due to inaccuracies in the frequency of the local oscillator included in the tuner 10, these IF carrier outputs are assumed to have a frequency tolerance of $\pm\Delta F$.

These first intermediate frequency carriers are applied to a broadband IF amplifier circuit 12. The frequency response curve of the broadband IF circuit is represented by the curve 14 in FIGURE 2. It will be noted that the bandwidth extends from approximately 40.5 megacycles to 46.5 megacycles so that no deterioration of the signals would occur even with values of $\Delta F$ as large as 0.75 megacycle. The broadband IF circuit 12 can therefore accommodate a total $\pm\Delta F$ of 1.5 megacycles.

The first intermediate frequency output of tuner 10 is also applied to a restricted-bandwidth first IF amplifier 16. The response of the amplifier 16 is represented by the curve 18 in FIGURE 3. It will be seen that the response of the amplifier is centered around the first intermediate frequency audio carrier and has been chosen to extend from approximately 40.5 megacycles to 42.0 megacycles to accommodate a total frequency variation of the audio carrier of ($\pm\Delta F$) or 1.5 megacycles. The response of the amplifier 16 is designed to reject the first IF video carrier, which is nominally at 45.75 megacycles, as well as the color subcarrier, if present, which is nominally at 42.17 megacycles. The restricted-bandwidth first IF amplifier delivers the first intermediate frequency audio carrier as a first input to the first mixer 20. A stable local oscillator 22 applies a second input to the first mixer 20. The local oscillator is preferably crystal controlled and is here chosen to oscillate at a frequency of 32.75 megacycles.

The output of the first mixer 20 is selected as the sum of the first IF audio carrier frequency (nominally 41.25 megacycles) and the crystal controlled local oscillator frequency (32.75 megacycles to provide a nominal sum of 74.0 megacycles. This output frequency, the second intermediate frequency, will carry with it the frequency variations of the first IF carrier, $\pm\Delta F$ in the same sense. It will also carry with it the audio frequency modulation component of the program sound, which may be designated as $\pm\delta F$. Since both carrier inputs to the first mixer are of constant amplitude, the amplitude of the second intermediate frequency carrier output of the first mixer will also be constant. Therefore, it is relatively immaterial as to how the amplitudes are arranged in the first mixer. Either one may be greater than the other or they may both be of the same amplitude. The only requirement is that at least one of them is large enough to insure a proper mixing action.

The second intermediate frequency output of the first mixer 20 is applied to a restricted-bandwith second IF amplifier 24. The frequency response characteristic for this amplifier 24 is represented by the curve 26 in FIGURE 4. It will be seen from FIGURE 4 that the passband of this amplifier 24 is shown to extend from approximately 73.25 megacycles to 74.75 megacycles, which is the same bandwidth as that of the amplifier 16. The amplifier 24 will therefore accommodate the same frequency excursions, $\pm\Delta F$, of the converted carrier as will the amplifier 16. It should also be noted that the center frequency of the passband of amplifier 24 is located in the middle of the 4 megacycles space which exists between television channels 4 and 5. This is a convenient frequency to use because it results in a relatively low frequency for the crystal controlled local oscillator 22 and at the same time, the second IF frequency cannot interfere (by feedback into the tuner, for example) with any of the television channels. It is also possible, of course, to arrange for the second IF frequency to be above channel 6, but this in turn would result in a higher frequency for the oscillator 22. In the interests of economy and stability, it is desirable to keep the frequency of oscillator 22 as low as possible.

The output of the second IF amplifier 24, together with the output of the broadband IF amplifier 12, are applied to a second mixer 26. The amplitude of the output of the restricted-bandwidth second IF amplifier 24, which is applied to the second mixer, is greater than the output of the broadband IF amplifier 12 also applied thereto. The output of the second mixer 26 is chosen as the difference between its two inputs. For the audio carrier, the output of the second mixer is $$(74.00 \text{ megacycles} \pm\Delta F \pm\delta F) - (41.25 \text{ megacycles} \pm\Delta F, \pm\delta F)$$

which equals 32.75 megacycles, since the two equal $\pm\Delta F$ components and the two equal $\pm\delta F$ components both cancel. It should be noted that this is precisely the frequency of the crystal controlled local oscillator 22. The video carrier output of the second mixer is (74.00 megacycles$\pm\Delta F\pm\delta F$)$-$45.75 megacycles$\pm\Delta F$, leaving 28.25 megacycles$\pm\delta F$. While the two equal $\pm\Delta F$ components cancel, the original frequency modulation $\pm\delta F$ of the first IF audio carrier is now transferred to the final IF video carrier.

It bears emphasis that the second mixing process results in a cancellation of the two $\pm\Delta F$ components and the final intermediate frequency carrier outputs of the second mixer have the frequency precision of the crystal controlled local oscillator 22. However, the audio carrier here is completely unmodulated while the video carrier is both amplitude modulated with video and frequency modulated with program audio. Provided that the amplitude relationship is correct in the second mixer 26, the amplitude of these carriers will depend entirely upon the amplitude of the first intermediate frequency carriers which form the first input to the second mixer. The video amplitude modulation of the final IF video carrier will therefore be a faithful replica of the video modulation of the video carrier IF output of tuner 10. As the second IF carrier input to the second mixer is a constant amplitude carrier, no limiting per se is required. The only amplitude requirement of this carrier input is that it be sufficient to cause the second mixer to function correctly.

The carrier outputs from the second mixer 26 are amplified by the final video IF amplifier 30 whose output is applied to the video detector circuit 32. Because the video carrier is now frequently modulated with audio as well, the response of the final IF amplifier cannot have the customary shape wherein the video carrier is positioned at $-6$db on a linear slope to compensate for the vestigial sideband characteristic of the transmitter. This would result in slope detection of the FM audio by the video detector and consequent interference of the reproduced video by the demodulated audio. One solution to this problem is to provide a final video IF response characteristic such as the form 34 shown in FIGURE 5. It should be noted on the curve shown in FIGURE 5 that the sloping characteristic around the video carrier is provided with a small plateau 34A at $-6$db. In view of the action of the preceding circuit, the video carrier is accurately positioned on this plateau, which may have a width of about $\pm 50$ kc. and which has no slope over this region. As the audio frequency modulation causes the video carrier to move back and forth only on the plateau, slope detection of the audio cannot occur and the recovered video will be free of audio interference.

The output of the video detector 32 is fed to the conventional TV receiver video amplifier and sync circuits. Also recovered from the video detector 32 is the intercarrier difference frequency at 4.5 megacycles. This is applied to a 4.5 megacycle audio IF amplifier 36. Since this carrier is the difference frequency between a stationary carrier at 41.25 megacycles and a frequency modulated carrier at 45.75 megacycles, it carries with it the frequency modulation component $\pm\delta F$ of the video carrier, and this is demodulated in the FM audio detector 38 to which the output of the audio IF amplifier is applied. The output of the FM audio detector 38 is applied to the subsequent conventional TV receiver audio circuits.

A preferred alternative amplitude response characteristic curve 40 for the final video IF amplifier 30 is shown in FIGURE 6. It should be noted that the amplitude response for the video sidebands is identical in shape to the vestigial sideband response at the transmitter itself. The response curve is essentially flat from 0.75 megacycles below the video carrier to a 4.2 megacycles above the video carrier and so the vestigial sideband is unattenuated. As before, the video carrier is seated on a flat portion of the curve so no audio FM slope detection, which would interfere with the video reproduction, can occur.

Unless the detected video output of the detector 32 is compensated in some manner, the overall receiver video response resulting from the IF response curve shown in FIGURE 6 would be as illustrated by the response curve 42 in FIGURE 7. As the video sidebands from 0 megacycles to 0.75 megacycles are transmitted and received effectively double sideband, while the components from 0.75 megacycles to 4.2 megacycles are transmitted and received single sideband, the amplitude of the former would be twice that of the latter. To counterbalance this effect, the desired video response of the circuits following the video detector 32 should be as shown by the response curve 44 in FIGURE 8. It should be noted that the response characteristic for video components from 0 megacycles to 0.75 megacycles are attenuated by 6db with respect to the video components from 0.75 megacycles to 4.2 megacycles. The overall receiver video response would then be as represented by the curve 46 in FIGURE 9, where all video components from 0 megacycles to 4.2 megacycles are treated equally.

A simple circuit for compensating the video response after detection to yield a result approaching that illustrated in FIGURE 9 is shown in FIGURE 10. In FIGURE 10, the detector circuit itself includes the final IF transformer 48, having the detector diode 50 connected to its secondary. A detector load resistor 52 is connected across the detector diode 50 and the secondary of the transformer 48. A bypass capacitor 54 is connected in shunt with the detector load. Two equal value resistors, respectively 56 and 58, are connected in series to form a voltage divider across the detector load and output to the video amplifier is taken from the junction of these two resistors. S shunting capacitor 60 is connected across the resistor 56. The value of the capacitor 60 is chosen such that it has appreciable reactance with respect to resistor 56 at frequencies below 0.75 magacycle and to have negligible reactance at frequencies from 0.75 megacycle to 4.0 megacycles. At frequencies from 0 megacycle to 0.75 megacycle, therefore, the two resistors serve to attenuate the detector output by 6 db, while at frequencies above 0.75 megacycle, there is no attenuation. The resultant response of this circuit approximates that represented by the curve 44 in FIGURE 8, and the effect of the vestigial sideband transmission is therefore compensated. As previously described, the video output from detector 32 which is free of slope detection interference, is delivered to the conventional TV receiver, video amplifier and sync circuits. From detector 32 is also recovered the intercarrier difference frequency of 4.5 megacycles which is frequency modulated with audio and which is demodulated in the conventional manner by the FM audio detector 38.

Accordingly, there has been shown and described herein a novel, useful and improved arrangement for compensating for the frequency variations in the IF carrier of a receiver due to the frequency variations of the local oscillator in the tuner. The arrangement shown herein avoids the necessity for amplitude limiting the IF carriers, thereby increasing the efficiency of the circuit and reducing the need for critical amplitude relationships required of the carrier signals being applied to the mixers.

We claim:

1. In a television receiver of the type wherein a tuner provides an output having a first video intermediate frequency carrier and a first audio intermediate frequency carrier and wherein said intermediate frequency carriers have frequency errors, apparatus for eliminating said frequency errors from said intermediate frequency carriers comprising a first mixer circuit, a second mixer circuit, means for applying only said first audio intermediate frequency carrier to said first mixer circuit, a source of stable frequency oscillations, means for applying signals from said source of stable frequency oscillations to said first mixer circuit, means for deriving a second intermediate frequency carrier from said first mixer circuit, means for applying said first intermediate frequency video carrier and said first intermediate frequency audio carrier to said second mixer circuit, means for applying said second intermediate frequency carrier to said second mixer circuit, and means for deriving an output from said second mixer circuit comprising a third audio intermediate frequency carrier at the frequency of said stable frequency oscillations and a stable video frequency carrier having a stable frequency related to that of said stable frequency oscillations.

2. In a television receiver of the type wherein a tuner provides an output comprising a first video intermediate frequency carrier and a first audio intermediate frequency carrier and wherein said intermediate frequency carriers have frequency errors, apparatus for eliminating said frequency errors from said intermediate frequency carriers comprising a first mixer circuit, a second mixer circuit, means for applying only said first audio intermediate frequency carrier to said first mixer circuit, a source of stable frequency oscillations, means for applying signals from said source of stable frequency oscillations to said first mixer circuit, means for deriving a second intermediate frequency carrier from said first mixer circuit, means for applying said first intermediate frequency video carrier and said first intermediate frequency audio carrier to said second mixer circuit, means for applying said second intermediate frequency carrier to said second mixer circuit, means for deriving an output from said second mixer circuit comprising a third audio intermediate frequency carrier at the frequency of said stable frequency oscillations and a third video intermediate frequency carrier having a stable frequency related to that of said stable frequency oscillation and having thereon both video and audio modulations, and means for preventing said audio modulations on said video carrier from interfering with the quality of the video which is subsequently displayed.

3. In a television receiver of the type wherein a tuner provides an output comprising a first video intermediate frequency carrier and a first audio intermediate frequency carrier and wherein said intermediate frequency carriers have frequency errors, apparatus for eliminating said frequency errors from said intermediate frequency carriers comprising a first mixer circuit, a second mixer circuit, means for applying only said first audio intermediate frequency carrier to said first mixer circuit, a source of stable frequency oscillations, means for applying signals from said source of stable frequency oscillations to said first mixer circuit, means for deriving a second intermediate frequency carrier at a frequency which is the sum of the frequency of said inputs to said first mixer circuit, means for applying said first intermediate frequency video carrier and said first intermediate frequency audio carrier to said second mixer circuit, means for applying said second intermediate frequency carirer to said second mixer circuit, means for deriving an output from said second mixer circuit comprising a third audio intermediate frequency carrier at the frequency of said stable frequency oscillations and a third video intermediate frequency carrier having a stable frequency related to that of said stable frequency oscillation and having thereon both video and audio modulations, and means for preventing said audio modulations on said video carrier from interfering with the quality of the video which is subsequently displayed, said means comprising a final video intermediate frequency amplifier coupled to the output of said second mixer circuit, said final video intermediate frequency amplifier having a flat amplitude versus frequency response characteristic extending on either side of the third video intermediate frequency over a frequency range corresponding to the audio frequency modulation range.

4. In a television receiver of the type wherein a tuner provides an output comprising a first video intermediate frequency carier amplitude modulated by video and a first audio intermediate frequency carrier frequency modulated by audio and wherein said intermediate frequency carriers have frequency errors, apparatus for eliminating said frequency errors from said intermediate frequency carriers comprising a first mixer circuit, a second mixer circuit, means for applying only said first audio intermediate frequency carrier to said first mixer circuit, a source of stable frequency oscillations, means for applying signals from said source of stable frequency oscillations to said first mixer circuit, means for deriving a second intermediate frequency carrier at a frequency which is the sum of the frequency of said inputs to said first mixer circuit, means for applying said first intermediate frequency video carrier and said first intermediate frequency audio carrier to said second mixer circuit, means for applying said second intermediate frequency carrier to said second mixer circuit, means for deriving an output from said second mixer circuit comprising a third audio intermediate frequency carrier at the frequency of said stable frequency oscillations and a third video intermediate frequency carrier having a stable frequency related to that of said stable frequency oscillation and having thereon both video and audio modulations, and means for preventing said audio modulations on said video carrier from interfering with the quality of the video which is subsequently displayed, including a final video intermediate frequency amplifier having an amplitude versus frequency response characteristic substantially identical to that of the vestigial sideband characteristic of the transmitter, means connecting said finel video intermediate frequency amplifier to receive the output of said second mixer, and a video detector circuit to which the output of said final video intermediate frequency amplifier is applied, said video detector circuit including circuit means for attenuating the output of said final video intermediate frequency amplifier in the region up to 0.75 megacycle to establish its proper amplitude with respect to the remainder of the video signal.

5. In a television receiver as recited in claim 4 wherein said network means comprises a first and a second resistor connected in series, means connecting said series connnected first and second resistors across said video detector, a capacitor connected across said first resistor, said capacitor having its value chosen such that at frequencies below 0.75 megacycle its reactance when compared to the resistance of said first resistor is substantial, and means to derive an output from across said second resistor.

References Cited by the Examiner

UNITED STATES PATENTS 2,426,187 8/1947 Earp ------------ 325—321 X

DAVID G. REDINBAUGH, *Primary Examiner.*

R. L. RICHARDSON, *Assistant Examiner.*